United States Patent
Wang et al.

(10) Patent No.: US 12,502,216 B2
(45) Date of Patent: Dec. 23, 2025

(54) MICROWAVE ABLATION NEEDLE HEAD AND MICROWAVE ABLATION NEEDLE

(71) Applicant: CANYON MEDICAL INC., Jiangsu (CN)

(72) Inventors: Weizhong Wang, Jiangsu (CN); Long Long, Jiangsu (CN)

(73) Assignee: CANYON MEDICAL INC., Jiangsu (CN)

( * ) Notice: Subject to any disclaimer, the term of this patent is extended or adjusted under 35 U.S.C. 154(b) by 815 days.

(21) Appl. No.: 17/642,941

(22) PCT Filed: Apr. 8, 2020

(86) PCT No.: PCT/CN2020/083723
§ 371 (c)(1),
(2) Date: Mar. 14, 2022

(87) PCT Pub. No.: WO2021/139017
PCT Pub. Date: Jul. 15, 2021

(65) Prior Publication Data
US 2022/0361947 A1   Nov. 17, 2022

(30) Foreign Application Priority Data
Jan. 7, 2020   (CN) .......................... 202010013350.7

(51) Int. Cl.
*A61B 18/14*   (2006.01)
*A61B 18/18*   (2006.01)
(Continued)

(52) U.S. Cl.
CPC .................... *A61B 18/1815* (2013.01); *A61B 2017/00871* (2013.01); *A61B 2017/0088* (2013.01);
(Continued)

(58) Field of Classification Search
CPC .................. A61B 18/1815; A61B 2018/00023
See application file for complete search history.

(56) References Cited

U.S. PATENT DOCUMENTS

| | | | |
|---|---|---|---|
| 6,290,699 B1 * | 9/2001 | Hall .................... | A61B 18/1402 606/41 |
| 2005/0062666 A1 * | 3/2005 | Prakash ............. | A61B 18/1815 343/790 |

(Continued)

FOREIGN PATENT DOCUMENTS

| | | |
|---|---|---|
| CN | 104042337 A | 9/2014 |
| CN | 105816240 A | 8/2016 |

(Continued)

OTHER PUBLICATIONS

International Search Report (including English Translation) and Written Opinion with regard to PCT/CN2020/083723 mailed Sep. 30, 2020.

(Continued)

*Primary Examiner* — Linda C Dvorak
*Assistant Examiner* — Ryan T Clark
(74) *Attorney, Agent, or Firm* — BCF LLP (57) ABSTRACT

A microwave ablation needle head and a microwave ablation needle are provided. The microwave ablation needle head comprises an outer tube, a cooling tube provided within and spaced apart from the outer tube, a coaxial cable, and an electrode. The outer tube comprises a first and a second branch tube sequentially provided from the outer tube's distal end to proximal end. The first branch tube has an end away from the second branch tube that forms the distal end of the outer tube, and is made of a ceramic material or a polymer material. A first cooling flow channel is formed between the cooling tube and the outer tube, the cooling tube is made of a polymer material, and the distal end of the (Continued)

cooling tube is located inside the distal end of the first branch tube, forming a mounting space in a distal end region of the cooling tube.

16 Claims, 3 Drawing Sheets

(51) Int. Cl.
    *A61B 17/00*         (2006.01)
    *A61B 18/00*         (2006.01)

(52) U.S. Cl.
    CPC ............... *A61B 2018/00023* (2013.01); *A61B 2018/00083* (2013.01); *A61B 2018/00148* (2013.01); *A61B 2018/00577* (2013.01); *A61B 2018/00827* (2013.01); *A61B 2018/1869* (2013.01)

(56) References Cited

U.S. PATENT DOCUMENTS

| | | | |
|---|---|---|---|
| 2009/0118732 A1* | 5/2009 | Desinger | A61B 18/1492 606/49 |
| 2012/0071870 A1* | 3/2012 | Salahieh | A61B 1/00181 606/33 |
| 2012/0172862 A1* | 7/2012 | Brannan | A61B 18/1815 606/33 |
| 2014/0276739 A1 | 9/2014 | Brannan et al. | |
| 2019/0380777 A1 | 12/2019 | Huang et al. | |

FOREIGN PATENT DOCUMENTS

| | | |
|---|---|---|
| CN | 107260301 A | 10/2017 |
| CN | 107260302 A | 10/2017 |
| CN | 109199582 A | 1/2019 |
| CN | 109602490 A | 4/2019 |
| CN | 109953824 A | 7/2019 |
| CN | 211300307 U | 8/2020 |
| EP | 3494917 A1 | 6/2019 |
| JP | 2014180550 A | 9/2014 |
| WO | 2018178317 A1 | 10/2018 |
| WO | 2019150258 A2 | 8/2019 |

OTHER PUBLICATIONS

English Abstract for CN109953824 retrieved on Jan. 18, 2022.
English Abstract for CN105816240 retrieved on Jan. 18, 2022.
English Abstract for CN107260302 retrieved on Jan. 18, 2022.
English Abstract for CN109199582 retrieved on Jan. 18, 2022.
English Abstract for CN109602490 retrieved on Jan. 18, 2022.
Office Action with regard to the the counterpart CN Patent Application No. CN202010013350.7 dated Sep. 30, 2024.
Office Action with regard to the the counterpart JP Patent Application No. 2022-504071 dated Oct. 26, 2022.

* cited by examiner

MICROWAVE ABLATION NEEDLE HEAD AND MICROWAVE ABLATION NEEDLE

CROSS-REFERENCES TO RELATED APPLICATIONS

The present application is a National Stage of International Application No. PCT/CN2020/083723, filed on Apr. 8, 2020, which claims the priority of a Chinese patent application filed with the Chinese Patent Office on Jan. 7, 2020, with an application number of 202010013350.7, entitled as "Microwave Ablation Needle Head and Microwave Ablation Needle".

TECHNICAL FIELD

The present disclosure relates to the field of microwave ablation treatment device, and in particular, to a microwave ablation needle head and a microwave ablation needle.

BACKGROUND ART

In recent years, microwave ablation therapy has become one of the important treatments for treating liver cancer, kidney cancer and soft tissues, such as thyroid, etc. Microwave ablation uses an antenna to radiate microwaves, wherein the microwaves cause the ions and polar water molecules in a tissue to rotate and vibrate, and rub against each other, to produce a thermal effect, so that the treatment area can quickly reach a very high temperature, making the tissue solidified and dehydrated to be necrotic, so as to achieve the purpose of treatment.

During the antenna radiation process of the existing microwave ablation needle, the outer conductor of the coaxial cable forms an induced current, which causes the ablation area to be uncontrollable and form an ellipsoid.

SUMMARY

The purposes of the present disclosure comprise, for example, providing a microwave ablation needle head and a microwave ablation needle, which can effectively suppress the induced current and eliminate the influence of the induced current on the ablation shapes, so that the heating area is concentrated in the radiation area, and a more ideal spherical ablation shape is obtained, to meet clinical needs. The embodiments of the present disclosure can be implemented as follows.

In the first aspect, the embodiment provides a microwave ablation needle head, comprising: an outer tube, a cooling tube, a coaxial cable, and an electrode.

The outer tube comprises a first branch tube and a second branch tube provided sequentially in a direction from a distal end to a proximal end of the outer tube, and an end of the first branch tube away from the second branch tube forms the distal end of the outer tube, wherein the material of the first branch tube is ceramic material or polymer material.

The cooling tube is arranged in the outer tube, the cooling tube and the outer tube are spaced apart from each other, and a first cooling flow channel is formed between the cooling tube and the outer tube, wherein the material of the cooling tube is a polymer material; and a distal end of the cooling tube is located inside a distal end of the first branch tube to form a mounting space in a distal region of the cooling tube.

The coaxial cable is arranged in the cooling tube, the coaxial cable is spaced apart from the cooling tube, and a second cooling flow channel is formed between the cooling tube and the coaxial cable; and a distal end of the coaxial cable is located in the distal end of the cooling tube.

At least part of the electrode is located in the mounting space, and is electrically connected to the distal end of the coaxial cable.

Optionally, the first branch tube and the second branch tube are in an insertion connection fit.

Optionally, an outer peripheral wall of the first branch tube is provided with a first annular groove, and a distal end of the second branch tube is inserted into and connected to the first annular groove.

Optionally, the first branch tube and the second branch tube are welded to each other.

Optionally, the first branch tube and the second branch tube are detachably connected to each other.

Optionally, the electrode is a cylindrical electrode, and a distal end of the first branch tube is closed and provided with a spike, so as to be configured to close the mounting space; and a part of the cylindrical electrode is located in a distal end of the cooling tube and is electrically connected to the coaxial cable; the remaining part of the cylindrical electrode protrudes from the distal end of the cooling tube and is located in the first branch tube, and the distal end of the cylindrical electrode is provided with a spacing from a distal end surface of the first branch tube.

Optionally, the electrode is a needle-type electrode, and a distal end of the first branch tube is open;

the needle-type electrode comprises a spike head and a connecting head connected to a proximal end surface of the spike head; and the spike head is connected to a distal end of the first branch tube and closes an opening at the distal end of the first branch tube, and the spike head is spaced apart from the distal end of the cooling tube; a part of the connecting head is located in the cooling tube and is configured to be electrically connected to the distal end of the coaxial cable.

Optionally, an outer peripheral wall of the spike head is provided with a second annular groove which is recessed in a direction close to an inside of the spike head, and the distal end of the first branch tube and the second annular groove are in an insertion connection fit.

Optionally, the spike head is welded and connected with the first branch tube.

Optionally, the spike head is detachably connected with the first branch tube.

Optionally, the coaxial cable comprises a first segment and a second segment that are sequentially connected in a direction from a distal end to a proximal end of the coaxial cable, and an end of the first segment away from the second segment forms the distal end of the coaxial cable, and the first segment is configured to be connected to the electrode; and the first segment is a segment of the coaxial cable with an inner conductor exposed, and the second segment is a segment of the coaxial cable with an insulation layer exposed.

Optionally, a maximum distance between a shielding layer peeling opening at one end of the second segment away from the first segment and an end of the second branch tube is ¼ of a length of a microwave wavelength.

Optionally, the microwave ablation needle head further comprises a sensing element, which is arranged on an outer peripheral wall of the first branch tube and configured to sense part of radiation current of the coaxial cable to enhance a radiation capability.

Optionally, the sensing element is arranged around the outer peripheral wall of the first branch tube.

Optionally, the sensing element is spray-coated on the outer peripheral wall of the first branch tube.

Optionally, the sensing element is of tubulation, and the sensing element is sleeved on the outer peripheral wall of the first branch tube.

Optionally, the outer peripheral wall of the first branch tube is provided with a third annular groove, and the sensing element is located in the third annular groove and does not protrude from a notch of the third annular groove.

Optionally, a length of the sensing element in an extension direction of the first branch tube is L1, a distance between a connection position between the first branch tube and the second branch tube and a proximal end of the electrode is L2, and the L1 is smaller than the L2.

Optionally, the sensing element is made of one of copper, iron, aluminum, gold, silver, palladium, platinum, tin, nickel, zinc and alloys thereof.

In the second aspect, the embodiment provides a microwave ablation needle, comprising a handle and the microwave ablation needle head mentioned above.

The handle is connected to a proximal end of the second branch tube, the handle comprises a first chamber and a second chamber, and the first chamber and the second chamber are respectively communicated with the first cooling flow channel and the second cooling flow channel, to form a cooling liquid circulation loop in combination.

Compared with the prior art, the beneficial effects of the embodiments of the present disclosure comprise, for example, the following.

The microwave ablation needle head comprises an outer tube, a cooling tube, a coaxial cable and an electrode. It can form a sleeve structure and a cooling flow channel allowing the cooling liquid to flow, by the outer tube, the coaxial cable and the cooling tube being sleeved mutually.

Through such a sleeve structure, the induced current generated after the electrode is energized can be consumed, and at the same time, the heat, which is generated by the sleeve structure consuming the induced current, can be taken away by the flowing of the cooling liquid in the cooling flow channel. Therefore, the microwave ablation needle head can effectively suppress the induced current and eliminate the influence of the induced current on the ablation shapes, so that the heating area is concentrated in the radiation area, and a relatively ideal spherical ablation shape is obtained to meet clinical needs.

BRIEF DESCRIPTION OF DRAWINGS

In order to explain the technical solutions of the embodiments of the present disclosure more clearly, the drawings needed in the embodiments will be briefly introduced as follows. It should be understood that the following drawings only show certain embodiments of the present disclosure, and therefore should not be regarded as a limitation on the scope. For those skilled in the art, other related drawings can be obtained based on these drawings without creative work.

Reference Numbers: 200—microwave ablation needle head; 210—electrode; 211—cylindrical electrode; 212—needle-type electrode; 2121—spike; 2122—connecting head; 2123—second annular groove; 220—outer tube; 221—first branch tube; 2211—first annular groove; 2212—third annular groove; 222—second branch tube; 230—coaxial cable; 231—first segment; 232—second segment; 240—cooling tube; 241—first cooling flow channel; 242—the second cooling flow channel; 250—mounting space; 260—sensing element; 300—microwave ablation needle; 310—handle; 311—first chamber; and 312—second chamber.

DETAILED DESCRIPTION OF EMBODIMENTS

In order to make the objectives, technical solutions, and advantages of the embodiments of the present disclosure clearer, the technical solutions in the embodiments of the present disclosure will be described clearly and completely with reference to the drawings in the embodiments of the present disclosure. Obviously, the described embodiments are a part of the embodiments of the present disclosure, but not all of the embodiments. The components of the embodiments of the present disclosure generally described and illustrated in the drawings herein may be arranged and designed in a variety of different configurations.

Therefore, the following detailed description of the embodiments of the present disclosure provided in the drawings is not intended to limit the scope of the claimed present disclosure, but merely represents selected embodiments of the present disclosure. Based on the embodiments in the present disclosure, all other embodiments obtained by a person skilled in the art without creative work shall fall within the protection scope of the present disclosure.

It should be noted that similar reference numbers and letters indicate similar items in the following drawings. Therefore, once an item is defined in one drawing, it does not need to be further defined and explained in the subsequent drawings.

In the description of the present disclosure, it should be noted that the orientation or position relationship indicated by the terms, "upper", "lower", "inner", "outer", etc., is based on the orientation or position relationship shown in the drawings, or is the orientation or position relationship in which the product of the present application is usually placed in use. It is only used for the convenience of describing the present disclosure and simplifying the description, rather than indicating or implying that the device or element referred to must be at the specific orientation, or constructed and operated in the specific orientation. Therefore, it cannot be understood as a limitation to the present disclosure.

In addition, if the terms, "first", "second", etc., appear, they are only used for distinguishing the description, and cannot be understood as indicating or implying importance in relativity.

It should be noted that, in the case of no conflict, the features in the embodiments of the present disclosure can be combined with each other.

Figure 1:
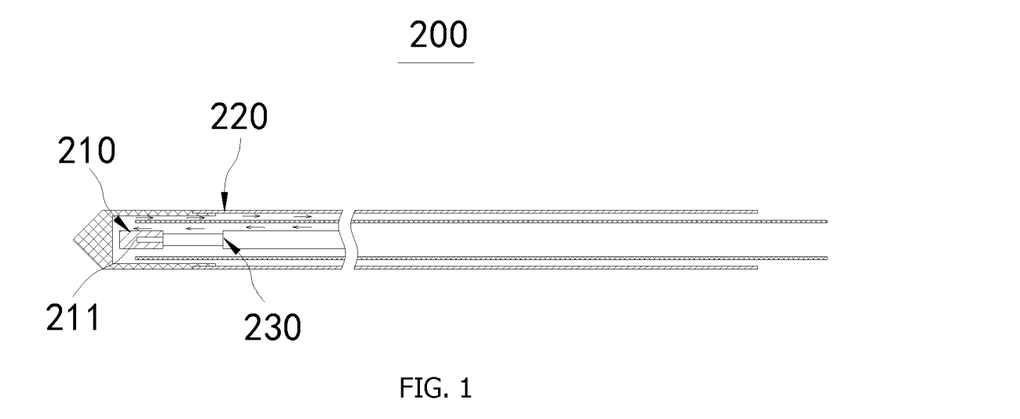
FIG. 1 is a schematic structural diagram of a microwave ablation needle head adopting a cylindrical electrode in the present disclosure.
Figure 2:
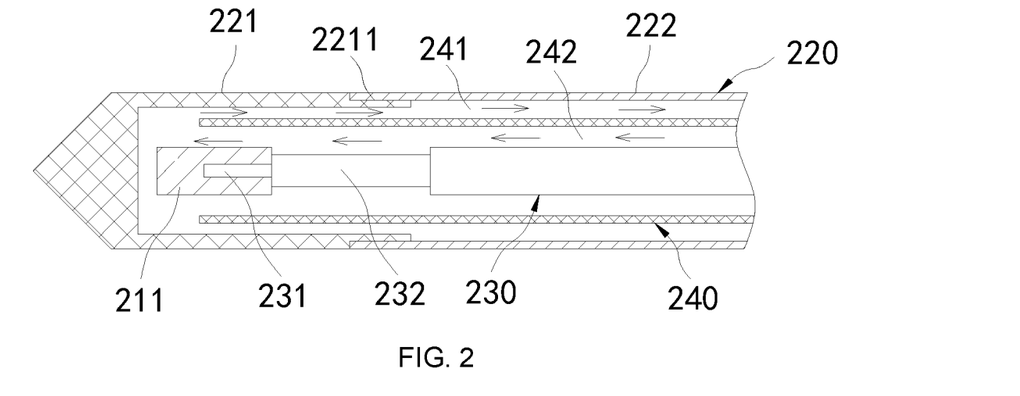
FIG. 2 is a partial schematic structural diagram of a microwave ablation needle head adopting a cylindrical electrode in the present disclosure.

Referring to FIG. 1 and FIG. 2, FIG. 1 and FIG. 2 show the structure of a microwave ablation needle head using a cylindrical electrode in an embodiment of the present disclosure. The present disclosure provides a microwave ablation needle head 200, which comprises an outer tube 220, a cooling tube 240, a coaxial cable 230, and an electrode 210.

Herein, the outer tube 220 comprises a first branch tube 221 and a second branch tube 222 sequentially arranged along the direction from the distal end to the proximal end of the outer tube 220, and the end of the first branch tube 221 away from the second branch tube 222 forms the distal end of the outer tube 220. The end of the second branch tube 222 away from the first branch tube 221 forms the proximal end of the outer tube 220, wherein the material of the first branch tube 221 is a ceramic material or a polymer material.

Optionally, the cooling tube 240 is arranged in the outer tube 220, and the cooling tube 240 and the outer tube 220 are spaced apart from each other, and a first cooling flow channel 241 is formed between the cooling tube 240 and the outer tube 220. Optionally, the outer peripheral wall of the cooling tube 240 and the inner peripheral wall of the outer tube have a spacing therebetween, so that the first cooling flow channel 241 is of an annular structure surrounding the cooling tube 240, wherein the material of the cooling tube 240 is a polymer material. The distal end of the cooling tube 240 is located inside the first branch tube 221. There is a spacing between the distal end of the cooling tube 240 and the inner wall of the distal end of the first branch tube 221 to form a mounting space 250 near the distal end region of the cooling tube 240.

Optionally, the coaxial cable 230 is arranged in the cooling tube 240, the coaxial cable 230 and the cooling tube 240 are spaced apart from each other, and a second cooling flow channel 242 is formed between the cooling tube 240 and the coaxial cable 230. Optionally, the outer peripheral wall of the coaxial cable 230 is provided with a spacing from the inner peripheral wall of the cooling tube 240, so that the second cooling flow channel 242 is of an annular structure surrounding the coaxial cable 230; and the distal end of the coaxial cable 230 is located inside the cooling tube 240, and the distal end of the coaxial cable 230 is provided with a spacing from the inner wall of the distal end of the first branch tube 221.

In the present disclosure, optionally, at least part of the electrode 210 is located in the mounting space 250 and is electrically connected to the distal end of the coaxial cable 230.

The working principle of the microwave ablation needle head 200 is as follows.

The microwave ablation needle head 200 comprises an outer tube 220, a cooling tube 240, a coaxial cable 230, and an electrode 210. The cooling tube 240 is sleeved outside the coaxial cable 230, and then the outer tube 220 is sleeved outside the cooling tube 240, so as to form a sleeve structure and a flow channel allowing the cooling liquid to flow. Herein, the role of the sleeve structure is to consume the induced current to suppress the induced current. When the sleeve structure suppresses the induced current, the heat generated can be taken away through the cooling liquid flowing in the first cooling flow channel 241 and the second cooling flow channel 242.

Therefore, when the electrode 210 is electrically connected to the coaxial cable 230 and is in a state of electrical conduction, the induced current generated by it will be suppressed by the sleeve structure, and at the same time, the heat generated by suppressing the induced current will disappear along with the flowing of the cooling fluid, so that during the working process, the microwave ablation needle head 200 can fulfill the effect of suppressing the induced current, and eliminate the influence of the induced current on the ablation shapes, and obtain a more ideal spherical ablation shape.

Optionally, when the first branch tube 221, the second branch tube 222, and the cooling tube 240 are provided, the second branch tube 222 can be made of a metal material, or a polymer material filled with continuous metal wire braids. At the same time, the first branch tube 221 is made of ceramic material or polymer material, and the cooling tube 240 is made of polymer material, therefore, when the microwave ablation needle head 200 is assembled, in cooperation with other structures, onto the microwave ablation needle 300, it can ensure the use strength and durability of the microwave ablation needle 300. In addition, it should be noted that after the microwave ablation needle head 200 is installed on the microwave ablation needle 300, during use, since the microwave ablation needle 300 needs to puncture and enter the human body, the first branch tube 221 and the second branch tube 222, when being provided, need to be made of materials that meet the requirements of medical biocompatibility.

For example, when providing the second branch tube 222, the second branch tube 222 can be made of a metal material, such as, 304 stainless steel, 316 stainless steel, cobalt-chromium alloy, nickel-titanium alloy or titanium alloy, etc., or a polymer tube filled with continuous metal wire braid, such as 304 stainless steel braid layer-reinforced PI (Polyimide Film) tube, etc.

When providing the first branch tube 221, the first branch tube 221 may be made of a ceramic material, such as alumina ceramics or zirconia ceramics, or polymer materials.

When providing the cooling tube 240, the cooling tube 240 can be made of polymer material tubes, such as PEEK (polyether ether ketone), PI (Polyimide Film), or PTFE (Poly tetra fluoroethylene), etc.

Optionally, it can be known from the foregoing that the function of the microwave ablation needle head 200 is to suppress the induced current, and during use, in order to improve the microwave energy suppression effect, the connection area of the electrode 210 and the coaxial cable 230 needs to be relatively located in the induced current suppression area of the microwave ablation needle head 200. Therefore, when the cooling tube 240 is installed, the distal end of the cooling tube 240 is located inside the distal end of the first branch tube 221 to form a mounting space 250 in the distal end area of the cooling tube 240. When the electrode 210 is installed, the electrode 210 needs to be electrically connected to the coaxial cable 230. Therefore, the coaxial cable 230 needs to be arranged in the cooling tube 240, and the distal end of the coaxial cable 230 is located in the distal end of the cooling tube 240. Therefore, after the electrode 210 is installed in the mounting space 250, the electrode 210 can be electrically connected with the distal end of the coaxial cable 230, and at the same time, the part of the electrode 210 electrically connected with the coaxial cable 230 can be relatively located in the mounting space 250 defined by the cooling tube 240 and the outer tube 220, so as to ensure the induced current emitted by the electrode 210 of the microwave ablation needle head 200 is located in the induced current suppression area, to ensure the suppression effect of the microwave ablation needle head 200 on the induced current.

Referring to FIG. 2, optionally, in the present disclosure, when the electrode 210 is installed, the electrode 210 may be a cylindrical electrode 211, and the distal end of the first branch tube 221 is closed and provided with a spike to be configured to close the mounting space 250.

When the electrode 210 is a cylindrical electrode 211, after the cylindrical electrode 211 is installed in the mounting space 250, part of the electrode 210 is located in the cooling tube 240, and the remaining part extends out from the distal end of the cooling tube 240 and is located in the first branch tube 221. At this time, the cylindrical electrode 211 does not have a blocking effect on the first branch tube 221, and meanwhile, in order to enable the mounting space 250 to be closed and make it able to penetrate the human body, the distal end of the first branch tube 221 can be provided as a closed end when the first branch tube 221 is provided, and at the same time, the distal end of the first branch tube 221 is provided with a spike extending from the first branch tube 221 in a direction away from the second branch tube 222, and the spike is configured to penetrate the human body. Therefore, through such an arrangement, the mounting space 250 can be closed, so that the first cooling flow channel 241 and the second cooling flow channel 242 are communicated with each other at the mounting space 250, so that the cooling liquid in the first cooling flow channel 241 can flow into the second cooling flow channel 242 or the cooling liquid in the second cooling flow channel 242 can flow into the first cooling flow channel 241. And in the process of using the microwave ablation needle head 200, the cooling liquid can be made to flow in the microwave ablation needle head 200. When the microwave ablation needle head 200 fulfills the function of suppressing the induced current, the heat generated by suppressing the induced current will be taken away through the flowing of the cooling liquid.

It should be noted that when the electrode 210 is a cylindrical electrode 211, the cylindrical electrode 211 can be made of copper, iron, aluminum, gold, silver, palladium, platinum, tin, nickel, zinc, or alloys thereof. In the present disclosure, the cylindrical electrode 211 is provided as being made of copper.

Specifically, when the cylindrical electrode 211 is provided, since the mounting space 250 is closed by the first branch tube 221, the cylindrical electrode 211 is located in the mounting space 250, and the part of the cylindrical electrode 211 located in the distal end of the cooling tube 240 is electrically connected the coaxial cable 230; and the remaining part of the cylindrical electrode 211 is located in the distal end of the first branch tube 221 and is not in contact with the inner end surface of the distal end of the first branch tube 221, so that the distal end of the cylindrical electrode 211 and the distal end of the first branch tube 221 are spaced apart from each other.

In the present disclosure, when the first branch tube 221 and the second branch tube 222 are connected, the proximal end of the first branch tube 221 is provided with a first annular groove 2211, and the first annular groove 2211 is located on the outer peripheral wall of the first branch tube 221. The distal end of the first annular groove 2211 has the spacing from the distal end of the first branch tube 221, and the proximal end of the first annular groove 2211 extends to the proximal end surface of the first branch tube 221. In other words, the outer peripheral wall of the first branch tube 221 is provided thereon with the first annular groove 2211 radially inward, and the distal end of the second branch tube 222 is snap-fitted with the first annular groove 2211. That is, the distal end of the second branch tube 222 is sleeved outside the proximal end of the first branch tube 221, and a part of the second branch tube 222 is snap-fitted with the first annular groove 2211.

It should be noted that by providing the first annular groove 2211, the wall thickness of the first branch tube 221 at the first annular groove 2211 can be reduced, so that after the second branch tube 222 is snapped with the first annular groove 2211, the outer wall of the second branch tube 222 will not protrude outward from the outer wall of the first branch tube 221, and the two will not form a stepped structure at the connecting joint, which is convenient for operation. For example, the outer diameters of the first branch tube 221 and the second branch tube 222 may be set as equal, so that the outer wall of the first branch tube 221 and the outer wall of the second branch tube 222 are located in the same annular surface.

Optionally, the first branch tube 221 and the second branch tube 222 may be fixedly connected with each other by welding or the like, or the first branch tube 221 and the second branch tube 222 may be detachably connected with each other.

Optionally, the first branch tube 221 and the second branch tube 222 can be connected with each other by adhesion. In addition, since the proximal end of the first branch tube 221 is provided with the first annular groove 2211, the first annular groove 2211 can serve to accommodate the glue, so as to improve the stability of the adhesion, and at the same time, after the adhesion is completed, the first annular groove 2211 and the glue accommodated in the first annular groove 2211 can also play a role of sealing.

In the present disclosure, the coaxial cable 230 comprises a first segment 231 and a second segment 232 arranged sequentially from the distal end to the proximal end thereof. The end of the first segment 231 away from the second segment 232 forms the distal end of the coaxial cable 230, the end of the second segment 232 away from the first segment 231 forms the proximal end of the coaxial cable 230. The first segment 231 is a segment of the coaxial cable 230 with the inner conductor exposed, and the second segment 232 is a segment of the coaxial cable 230 with the insulation layer exposed.

Similarly, in order for that the coaxial cable 230 connected to the electrode 210 is relatively located in the induced current suppression area of the microwave ablation needle head 200, the first segment 231 is configured to be connected to the electrode 210, and the first segment 231 and the second segment 232 both extend into the first branch tube 221. In addition, the length for which the electrode 210 is connected with the first segment 231 is less than or equal to the length of the second segment 232. When the second segment 232 is provided, the maximum spacing between the shielding layer peeling opening at the end of the second segment 232 away from the first segment 231, and the end of the adjacent second branch tube 222 is ¼ of the microwave wavelength. Herein, the microwave wavelength is $$\frac{c}{f*\sqrt{\varepsilon}},$$

where C is the speed of light, f is the frequency of the microwave, and ε is the composite dielectric constant composed of the material of the first branch tube 221, the cooling liquid, the insulating medium of the coaxial cable 230, and the cooling tube 240.

Figure 3:
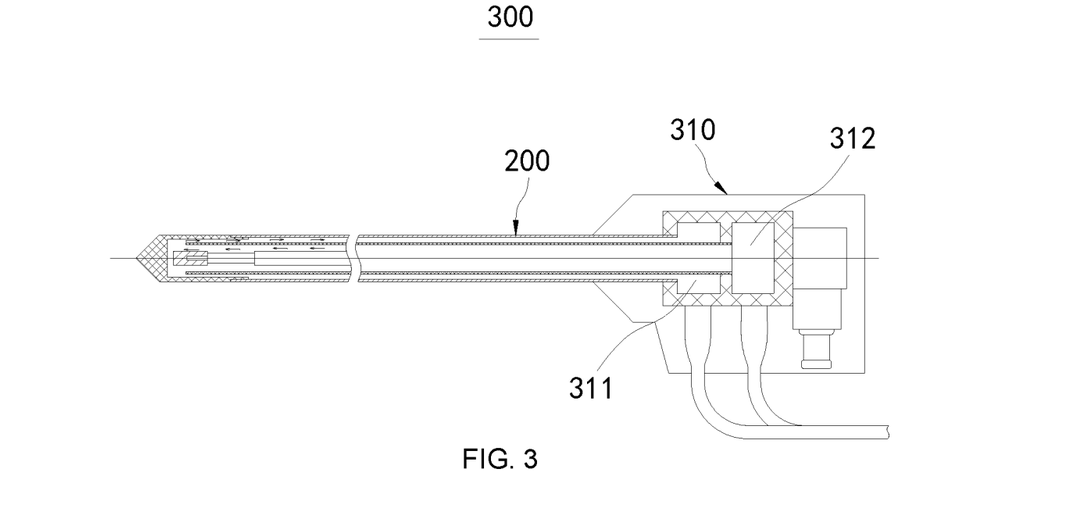
FIG. 3 is a schematic structural diagram of a microwave ablation needle adopting a cylindrical electrode in the present disclosure.

Referring to FIG. 3, FIG. 3 shows the structure of a microwave ablation needle using cylindrical electrode in the present disclosure. Based on the above-mentioned microwave ablation needle head 200, the present disclosure also provides a microwave ablation needle 300. The microwave ablation needle 300 comprises a handle 310 and the above-mentioned microwave ablation needle head 200.

Herein, the handle 310 is connected to the proximal end of the second branch tube 222, and the handle 310 comprises a first chamber 311 and a second chamber 312 that are independent of each other. In other words, the first chamber 311 and the second chamber 312 are independently arranged and not communicated with each other. The first chamber 311 and the second chamber 312 are respectively communicated with the first cooling flow channel 241 and the second cooling flow channel 242 and jointly form a cooling liquid circulation loop.

The microwave ablation needle 300 adopts the above-mentioned microwave ablation needle head 200, which can consume the induced current through the sleeve structure formed by the microwave ablation needle head 200 and the filler filled in the sleeve, and thus can play in the working process the role of suppressing the induced current, and eliminate the influence of the induced current on the ablation shapes, obtaining a more ideal spherical ablation shape.

Based on the above-mentioned microwave ablation needle 300, this embodiment also provides a medical device, which comprises a microwave generating device (not shown in the figures), a liquid supply device (not shown in the figures), and the above-mentioned microwave ablation needle 300.

Herein, the microwave generating device is connected with the coaxial cable 230 to provide microwave energy to the coaxial cable 230. A liquid supply device is communicated with both the first chamber 311 and the second chamber 312, so as to supplement the circulating cooling liquid to the first cooling flow channel 241, the second cooling flow channel 242, the first chamber 311 and the second chamber 312, and promote the circulating flow of the cooling liquid, so that the cooling liquid can take away the heat generated when the sleeve structure suppresses the induced current.

To sum up, in the process of microwave ablation treatment of this medical device, since the above-mentioned microwave ablation needle 300 is used, it can achieve, by the sleeve structure formed by the microwave ablation needle head 200 and the filler filled in the sleeve, the effect of consuming the induced current, and then the medical device can fulfill the effect of suppressing the induced current during the microwave ablation treatment, and eliminate the influence of the induced current on the ablation shapes, so that the heating area is concentrated in the radiation area, obtaining a more ideal spherical ablation shape and meeting the clinical needs.

Figure 4:
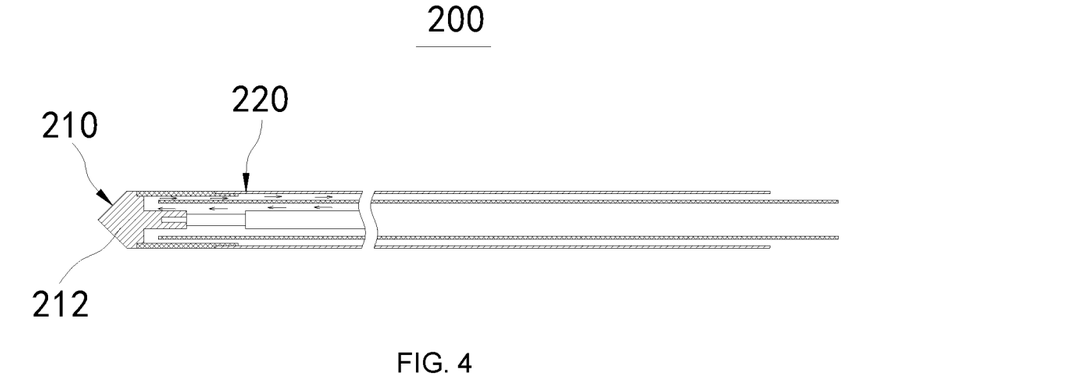
FIG. 4 is a schematic structural diagram of a microwave ablation needle head adopting a needle-type electrode in the present disclosure.
Figure 5:
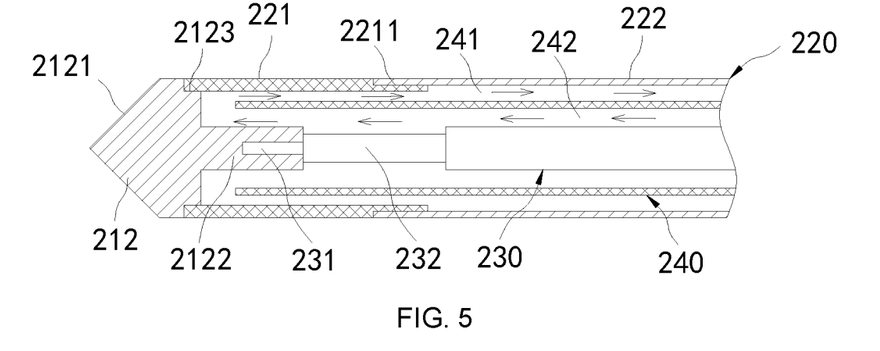
FIG. 5 is a partial schematic structural diagram of a microwave ablation needle head adopting a needle-type electrode in the present disclosure.

Referring to FIG. 4 and FIG. 5, FIG. 4 and FIG. 5 show the structure of a microwave ablation needle head using a needle-type electrode in the disclosure. It should be noted that, in the present disclosure, when the electrode 210 is provided, the electrode 210 may also be a needle-type electrode 212.

When the electrode 210 is the needle-type electrode 212, the position relationships and connection modes of it and the outer tube 220, the cooling tube 240, and the coaxial cable 230 are the same as the arrangement of the cylindrical electrode 211 and the outer tube 220, the cooling tube 240 and the coaxial cable 230. And, the microwave ablation needle head 200 using the needle-type electrode 212 are also in the manner in which the cooling tube 240 is sleeved outside the coaxial cable 230, and then the outer tube 220 is sleeved outside the cooling tube 240 to form the sleeve structure and the cooling flow channel allowing the cooling fluid to flow, and such a sleeve structure is used to consume the induced current generated after the electrode 210 is energized, and at the same time, the flow of the cooling liquid in the cooling flow channel can take away the heat generated by the sleeve structure consuming the induced current.

Therefore, the microwave ablation needle head 200 using the needle-type electrode 212 can also effectively suppress the induced current and eliminate the influence of the induced current on the ablation shapes, so that the heating area is concentrated in the radiation area, and a more ideal spherical ablation shape is obtained, meeting the clinical needs.

It should be noted that when the needle-type electrode 212 is used, the difference from the above-mentioned microwave ablation needle head 200 using the cylindrical electrode 211 is that the distal end of the first branch tube 221 of the microwave ablation needle head 200 is provided with an opening, and the needle-type electrode 212 is installed in the opening and closes the opening. At the same time, the needle-type electrode 212 comprises a spike head 2121 and a connecting head 2122 connected to the proximal end surface of the spike head 2121. The proximal end surface of the spike head 2121 and the distal end of the cooling tube 240 are spaced apart from each other, so that the first cooling flow channel 241 and the second cooling flow channel 242 are connected through the gap between them; and the part of the connecting head 2122 is located inside the distal end of the cooling tube 240 and configured to be electrically connected to the distal end of the coaxial cable 230.

When the spike head 2121 is connected to the distal end of the first branch tube 221, it can close the opening of the distal end of the first branch tube 221, so that the mounting space 250 is closed, therefore the first cooling flow channel 241 and the second cooling flow channel 242 are communicated with each other through the mounting space 250, and the cooling liquid in the first cooling flow channel 241 can flow into the second cooling flow channel 242 or the cooling liquid in the second cooling flow channel 242 can flow into the first cooling flow channel 241. And, in the process of using the microwave ablation needle head 200, the cooling liquid can flow in the microwave ablation needle head 200. When the microwave ablation needle head 200 fulfills the function of suppressing the induced current, the flowing of the cooling liquid will take away the heat generated by suppressing the induced current.

In addition, when connecting the needle-type electrode 212 and the first branch tube 221, in order to facilitate the positioning and cooperation of the needle-type electrode 212 and the first branch tube 221, optionally, the part of the outer peripheral wall of the spike head 2121 is recessed in the direction close to the inside of the spike head 2121, to form a second annular groove 2123. The distal end of the second annular groove 2123 has a spacing from the distal end of the spike head 2121. The proximal end of the second annular groove 2123 extends to the proximal end surface of the spike head 2121, and the distal end of the first branch tube 221 is in the insertion connection fit with the second annular groove 2123.

It should be understood that by providing the second annular groove 2123 on the outer peripheral wall of the spike head 2121, the wall thickness at the position where the spike head 2121 has the second annular groove 2123 is small, so that after the first branch tube 221 is sleeved outside the spike head 2121, that is, after the first branch tube 221 is inserted into and connected to the second annular groove 2123, the outer wall of the first branch tube 221 does not protrude from the outer wall of the spike head 2121. For example, in the present disclosure, the first branch tube 221 and the spike head 2121 do not form a step at the connection position.

Optionally, the proximal end of the spike head 2121 and the distal end of the first branch tube 221 may be fixedly connected with each other by means of welding or the like, or the proximal end of the spike head 2121 and the distal end of the first branch tube 221 can be detachably connected with each other.

Optionally, the proximal end of the spike head 2121 and the distal end of the first branch tube 221 may be connected with each other by means of adhesion. Furthermore, the second annular groove 2123 at the proximal end of the spike head 2121 can play the role of accommodating glue. This arrangement can improve the stability of the adhesion, and at the same time, after the adhesion is completed, the function of sealing can also be achieved by the second annular groove 2123 and the glue accommodated in the second annular groove 2123.

Figure 7:
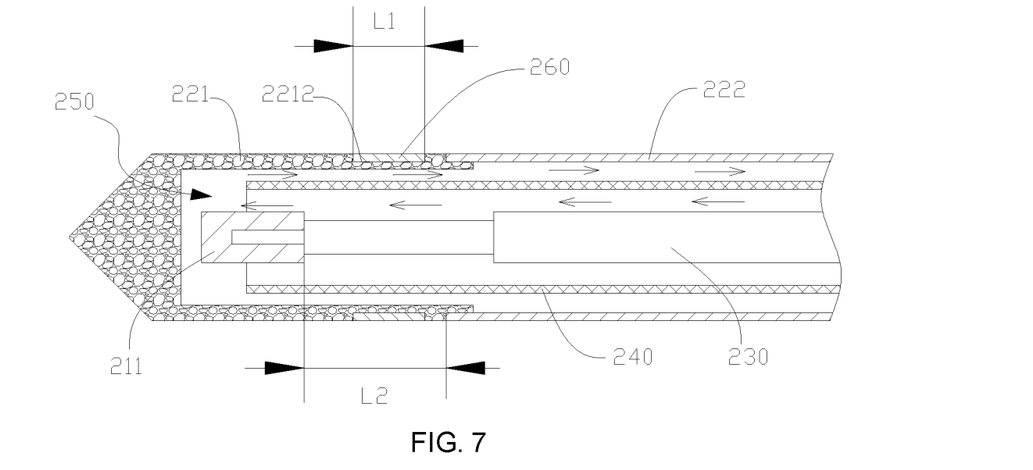
FIG. 7 is a partial schematic structural diagram of a microwave ablation needle head adopting a cylindrical electrode, with a sensing element provided, in the present disclosure.
Figure 8:
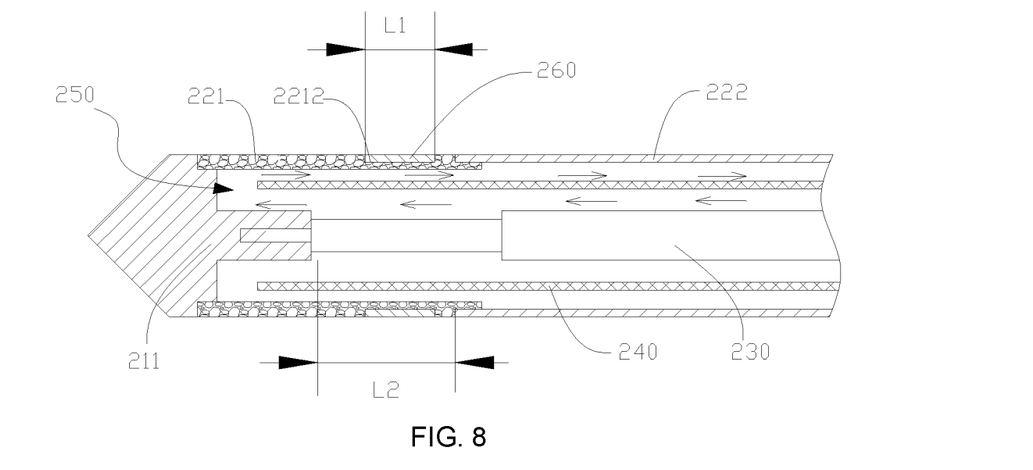
FIG. 8 is a partial schematic structural diagram of a microwave ablation needle head adopting a needle-type electrode, with a sensing element provided, in the present disclosure.

Referring to FIGS. 7 and 8, in the present disclosure, optionally, the microwave ablation needle head 200 further comprises a sensing element 260, the sensing element 260 is sleeved outside the first branch tube 221, and the sensing element 260 is wrapped in the radiation area of the coaxial cable 230. The part of the radiation current on the coaxial cable 230 is induced to the sensing element 260, which indirectly increases the radiation ability of the electrode 210 to act on the lesion tissues, improving the ablation effect.

Optionally, the sensing element 260 can be spray-coated on the outside of the first branch tube 221 by plasma spray-coating. It is sprayed around the first branch tube 221 to form a ring structure; or, the sensing element 260 is provided as tubulation and directly sleeved outside the first branch tube 221. It should be noted that the length of the sensing element 260 in the extension direction of the first branch tube 221 is L1, and the distance between the joint position of the first branch tube 221 and the second branch tube 222 and the connection position of the first segment 231 and the second segment 232 is L2, and L1 is less than L2. It should be noted that when the electrode 210 is sleeved outside the first segment 231, the proximal end of the electrode 210 is flush with the connection position of the first segment 231 and the second segment 232 (i.e. the portion where the first segment 231 is connected with the second segment 232), that is, the distance from the joint position between the first branch tube 221 and the second branch tube 222 to the proximal end of the electrode 210 is L2.

Optionally, the sensing element 260 may be made of one of copper, iron, aluminum, gold, silver, palladium, platinum, tin, nickel, zinc, and alloys thereof. For example, the sensing element 260 in the present disclosure is made of 304 stainless steel.

Optionally, the outer peripheral wall of the first branch tube 221 is provided with a third annular groove 2212, the third annular groove 2212 is recessed inward along the radial direction of the first branch tube 221, the sensing element 260 is located in the third annular groove 2212, and the connection between the sensing element 260 and the first branch tube 221 is firm and reliable, and it is not easy to fall off; and the wall thickness of the first branch tube 221 at the third annular groove 2212 is small, which is convenient for the sensing element 260 to sense the radiation current on the coaxial cable 230.

It should be understood that when the electrode 210 is a cylindrical electrode 211 or a needle-type electrode 212, the sensing element 260 may be provided on the outer peripheral wall of the first branch tube 221 to enhance the radiation ability and improve the ablation effect.

Figure 6:
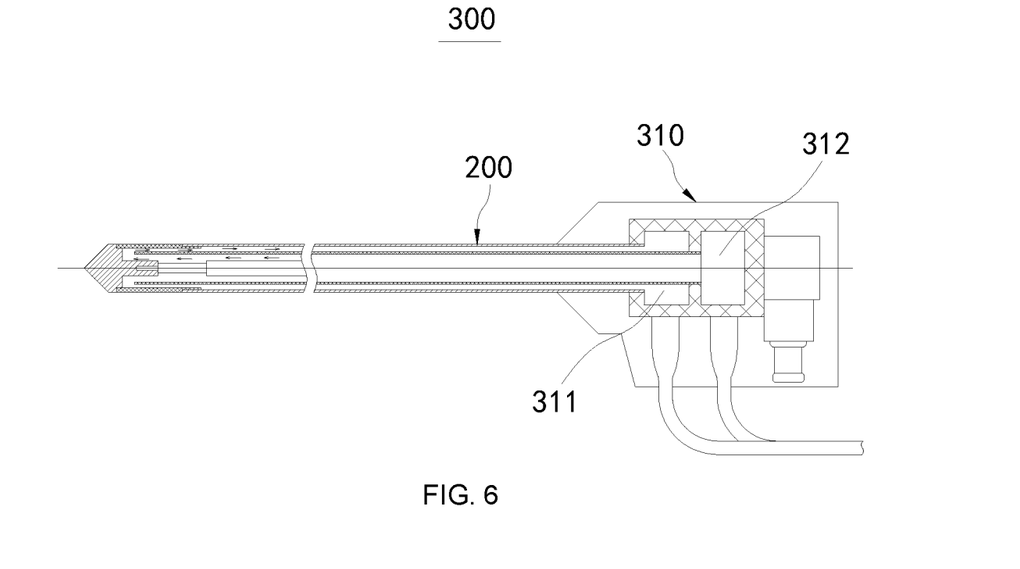
FIG. 6 is a schematic structural diagram of a microwave ablation needle adopting a needle-type electrode in the present disclosure.

Referring to FIG. 6, FIG. 6 shows the structure of a microwave ablation needle using a needle-type electrode in the present disclosure. Based on the aforementioned microwave ablation needle head 200 using the needle-type electrode 212, the present disclosure also provides a microwave ablation needle 300. The microwave ablation needle 300 comprises a handle 310 and the aforementioned microwave ablation needle head 200. Herein, the handle 310 is connected to the proximal end of the second branch tube 222. The handle 310 comprises a first chamber 311 and a second chamber 312. The first chamber 311 and the second chamber 312 are respectively communicated with the first cooling flow channel 241 and the second cooling flow channel 242, so as to form a cooling liquid circulation loop in combination.

The microwave ablation needle 300, through adopting the microwave ablation needle head 200 using the needle-type electrode 212, can achieve the effect of consuming the induced current, through the sleeve structure formed by the microwave ablation needle head 200 and the filler filled in the sleeve. Furthermore, it can achieve the effect of suppressing the induced current during the working process, and eliminate the influence of the induced current on the ablation shapes, obtaining a more ideal spherical ablation shape.

Based on the above-mentioned microwave ablation needle 300 using the needle-type electrode 212, the present disclosure also provides a medical device. The medical device comprises a microwave generating device, a liquid supply device, and the above-mentioned microwave ablation needle 300, wherein the microwave generating device and the coaxial cable 230 are connected with each other to provide microwave energy to the coaxial cable 230; the liquid supply device communicates with both the first chamber 311 and the second chamber 312 to supplement the circulating cooling liquid to the first cooling flow channel 241, the second cooling flow channel 242, the first chamber 311 and the second chamber 312, and promote the cooling liquid to flow in circulation, so that the cooling liquid can take away the heat generated by suppressing the induced current.

To sum up, in the process of this medical device performing the microwave ablation treatment, because of using the above-mentioned microwave ablation needle 300, it can achieve, by the sleeve structure formed by the microwave ablation needle head 200 and the filler filled in the sleeve, the effect of consuming the induced current. Furthermore, the medical device can fulfill the effect of suppressing the induced current during the microwave ablation treatment, and eliminate the influence of the induced current on the ablation shapes, so that the heating area is concentrated in the radiation area, and a more ideal spherical ablation shape is obtained, meeting the clinical needs.

The above are only embodiments of the present disclosure, but the protection scope of the present disclosure is not limited thereto. Changes or substitutions, readily envisaged by any person skilled in the art within the technical scope disclosed in the present disclosure, should be all covered within the protection scope of this disclosure. Therefore, the protection scope of the present disclosure should be subject to the protection scope of the claims.

INDUSTRIAL APPLICABILITY

In summary, the present disclosure provides a microwave ablation needle head and a microwave ablation needle, which can effectively suppress the induced current and obtain a more ideal spherical ablation shape.

What is claimed is:

1. A microwave ablation needle head, comprising:
an outer tube, wherein the outer tube comprises a first branch tube and a second branch tube provided sequentially in a direction from a distal end to a proximal end of the outer tube, and an end of the first branch tube away from the second branch tube forms a distal end of the outer tube, wherein a material of the first branch tube is a ceramic material or polymer material;
a cooling tube, wherein the cooling tube is arranged in the outer tube, the cooling tube and the outer tube are spaced apart from each other, and a first cooling flow channel is formed between the cooling tube and the outer tube, wherein a material of the cooling tube is a polymer material; and a distal end of the cooling tube is located inside a distal end of the first branch tube to form a mounting space in a distal region of the cooling tube;
a coaxial cable, wherein the coaxial cable is arranged in the cooling tube, the coaxial cable is spaced apart from the cooling tube, and a second cooling flow channel is formed between the cooling tube and the coaxial cable; and a distal end of the coaxial cable is located in the distal end of the cooling tube; and
an electrode, wherein at least part of the electrode is located in the mounting space, and is electrically connected to the distal end of the coaxial cable;
wherein the microwave ablation needle head further comprises a sensing element, which is arranged on an outer peripheral wall of the first branch tube, wrapped in a radiation area of the coaxial cable and configured to sense a part of radiation current of the coaxial cable to enhance a radiation capability;
wherein the sensing element is spray-coated on the outer peripheral wall of the first branch tube, or wherein the sensing element is of tubulation, and the sensing element is sleeved over the outer peripheral wall of the first branch tube,
wherein the sensing element is made of one of copper, iron, aluminum, gold, silver, palladium, platinum, tin, nickel, zinc and alloys thereof.

2. The microwave ablation needle head according to claim 1, wherein the first branch tube and the second branch tube are in an insertion connection fit.

3. The microwave ablation needle head according to claim 2, wherein an outer peripheral wall of the first branch tube is provided with a first annular groove, and a distal end of the second branch tube is inserted into and connected to the first annular groove.

4. The microwave ablation needle head according to claim 1, wherein the first branch tube and the second branch tube are welded to each other.

5. The microwave ablation needle head according to claim 1, wherein the first branch tube and the second branch tube are detachably connected to each other.

6. The microwave ablation needle head according to claim 1, wherein the electrode is a cylindrical electrode, and the distal end of the first branch tube is closed and provided with a spike, so as to be configured to close the mounting space; and
a part of the cylindrical electrode is located in the distal end of the cooling tube and is electrically connected to the coaxial cable; a remaining part of the cylindrical electrode protrudes from the distal end of the cooling tube and is located in the first branch tube, and the distal end of the cylindrical electrode is provided with a spacing from a distal end surface of the first branch tube.

7. The microwave ablation needle head according to claim 1, wherein the electrode is a needle-type electrode, and the distal end of the first branch tube is provided with an opening;
the needle-type electrode comprises a spike head and a connecting head connected to a proximal end surface of the spike head; and
the spike head is connected to the distal end of the first branch tube and closes the opening at the distal end of the first branch tube, and the spike head is spaced apart from the distal end of the cooling tube; a part of the connecting head is located in the cooling tube and is configured to be electrically connected to the distal end of the coaxial cable.

8. The microwave ablation needle head according to claim 7, wherein an outer peripheral wall of the spike head is provided with a second annular groove which is recessed in a direction close to inside of the spike head, and the distal end of the first branch tube and the second annular groove are in an insertion connection fit.

9. The microwave ablation needle head according to claim 7, wherein the spike head is welded and connected with the first branch tube.

10. The microwave ablation needle head according to claim 7, wherein the spike head is detachably connected with the first branch tube.

11. The microwave ablation needle head according to claim 1, wherein the coaxial cable comprises a first segment and a second segment that are sequentially connected in a direction from the distal end to a proximal end of the coaxial cable, and an end of the first segment away from the second segment forms the distal end of the coaxial cable, and the first segment is configured to be connected to the electrode; and
the first segment is a segment of the coaxial cable with an inner conductor exposed, and the second segment is a segment of the coaxial cable with an insulation layer exposed.

12. The microwave ablation needle head according to claim 11, wherein a maximum distance between a shielding layer peeling opening at one end of the second segment away from the first segment and an end of the second branch tube is ¼ of a length of microwave wavelength.

13. The microwave ablation needle head according to claim 1, wherein the sensing element is arranged around the outer peripheral wall of the first branch tube.

14. The microwave ablation needle head according to claim 1, wherein the outer peripheral wall of the first branch tube is provided with a third annular groove, and the sensing element is located in the third annular groove and does not protrude from a notch of the third annular groove.

15. The microwave ablation needle head according to claim 1, wherein a length of the sensing element in an extension direction of the first branch tube is L1, a distance between a connection position between the first branch tube and the second branch tube and a proximal end of the electrode is L2, and the L1 is smaller than the L2.

16. A microwave ablation needle, wherein the microwave ablation needle comprises a handle and the microwave ablation needle head according to claim 1; and the handle is connected to a proximal end of the second branch tube, the handle comprises a first chamber and a second chamber, and the first chamber and the second chamber are respectively communicated with the first cooling flow channel and the second cooling flow channel, to form a cooling liquid circulation loop in combination.

\* \* \* \* \*